United States Patent
Teshirogi et al.

(10) Patent No.: US 11,487,957 B2
(45) Date of Patent: Nov. 1, 2022

(54) READING APPARATUS, WIRELESS TAG READER, AND CODE READER

(71) Applicant: TOSHIBA TEC KABUSHIKI KAISHA, Tokyo (JP)

(72) Inventors: Hideki Teshirogi, Tokyo (JP); Katsutoshi Watanabe, Tokyo (JP); Ran Katsurada, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/329,061

(22) Filed: May 24, 2021

(65) Prior Publication Data
US 2022/0004722 A1 Jan. 6, 2022

(30) Foreign Application Priority Data
Jul. 1, 2020 (JP) .............................. JP2020-113783

(51) Int. Cl.
| G06K 7/10 | (2006.01) |
| G06K 7/00 | (2006.01) |
| G07G 1/00 | (2006.01) |
| G06Q 20/20 | (2012.01) |
| G06K 7/14 | (2006.01) |
| G06Q 10/08 | (2012.01) |

(52) U.S. Cl.
CPC ....... *G06K 7/0004* (2013.01); *G06K 7/10316* (2013.01); *G06K 7/10722* (2013.01); *G06K 7/10881* (2013.01); *G06K 7/1413* (2013.01); *G06Q 10/087* (2013.01); *G06Q 20/208* (2013.01); *G06K 2007/10524* (2013.01)

(58) Field of Classification Search
CPC .. G06K 7/0004; G06K 7/0081; G06K 7/1098; G06K 7/10316; G06K 7/10386; G06K 7/10722; G06K 7/10881; G07G 1/0081
USPC ....................................................... 235/440
See application file for complete search history.

(56) References Cited

U.S. PATENT DOCUMENTS

| 2009/0289116 A1* | 11/2009 | Copeland ........... G06K 7/10346 235/440 |
| 2011/0121075 A1* | 5/2011 | Bellows ............... G06K 7/0004 235/440 |
| 2019/0180062 A1 | 6/2019 | Murofushi | |

* cited by examiner

*Primary Examiner* — Toan C Ly
(74) *Attorney, Agent, or Firm* — Kim & Stewart LLP (57) ABSTRACT

A reading apparatus includes a wireless tag reader including an antenna and an antenna surface facing a first direction and through which the antenna emits a radio wave to read tag information from a wireless tag, and a code reader including an imaging unit and an imaging window facing the first direction and through which the imaging unit acquires an image to read a code. The code reader further includes a grip detachably connected to the wireless tag reader.

20 Claims, 10 Drawing Sheets

| Magnetic Flux Density | Wireless Tag Reader Status |
|---|---|
| Above 10 mT | Code Reader Connected<br>Trigger Switch Turned On |
| Between 4 mT and 10 mT | Code Reader Connected<br>Trigger Switch Turned Off |
| Below 4 mT | Code Reader Disconnected |

FIG. 10

READING APPARATUS, WIRELESS TAG READER, AND CODE READER

CROSS-REFERENCE TO RELATED APPLICATIONS

This application is based upon and claims the benefit of priority from Japanese Patent Application No. 2020-113783, filed Jul. 1, 2020, the entire contents of which are incorporated herein by reference.

FIELD

Embodiments described herein relate generally to a reading apparatus, a wireless tag reader, and a code reader.

BACKGROUND

In recent years, with the spread of RFID (Radio Frequency Identification) tags (also referred to as wireless tags), the number of stores adopting POS (Point Of Sales) terminals using wireless tag readers has increased. This type of POS terminal includes a stationary wireless tag reader and an optical code reader such as a handheld barcode reader.

When a commodity to which a wireless tag has been attached is placed in a reading area for the wireless tag reader, the POS terminal reads tag information from the wireless tag and registers the commodity. When no wireless tag is attached to a commodity or the wireless tag is defective, an operator uses the optical code reader to read code information indicated by a code symbol such as a barcode attached to the commodity so that the POS terminal can register the commodity. Then, the POS terminal performs a checkout or settlement process on the registered commodity.

Additionally, stores regularly perform inventory work. For example, the inventory work is performed when the store is closed, and the store investigates the number of commodities in stock. The inspection of the number of commodities in stock is performed by collecting tag information from a wireless tag attached to each commodity displayed on the store's commodity shelves by using a wireless tag reader, for example. In order to read tag information from wireless tags attached to commodities on all the various commodity shelves, a handheld wireless tag reader is generally used. In addition, in order to collect information about commodities with no wireless tag attached or commodities with a damaged wireless tag, a handheld optical code reader may also be used together with the handheld wireless tag reader during the inventory work.

Conventionally, the wireless tag reader and the optical code reader used for the inventory work are separate from those used for the commodity registration process (checkout processing).

DETAILED DESCRIPTION

In general, according to one embodiment, a reading apparatus includes a wireless tag reader including an antenna and an antenna surface facing a first direction and through which the antenna emits a radio wave to read tag information from a wireless tag, and a code reader including an imaging unit and an imaging window facing the first direction and through which the imaging unit acquires an image to read a code. The code reader further includes a grip detachably connected to the wireless tag reader.

Hereinafter, an information reading apparatus according to one or more embodiments will be described with reference to the drawings.

Figure 1:
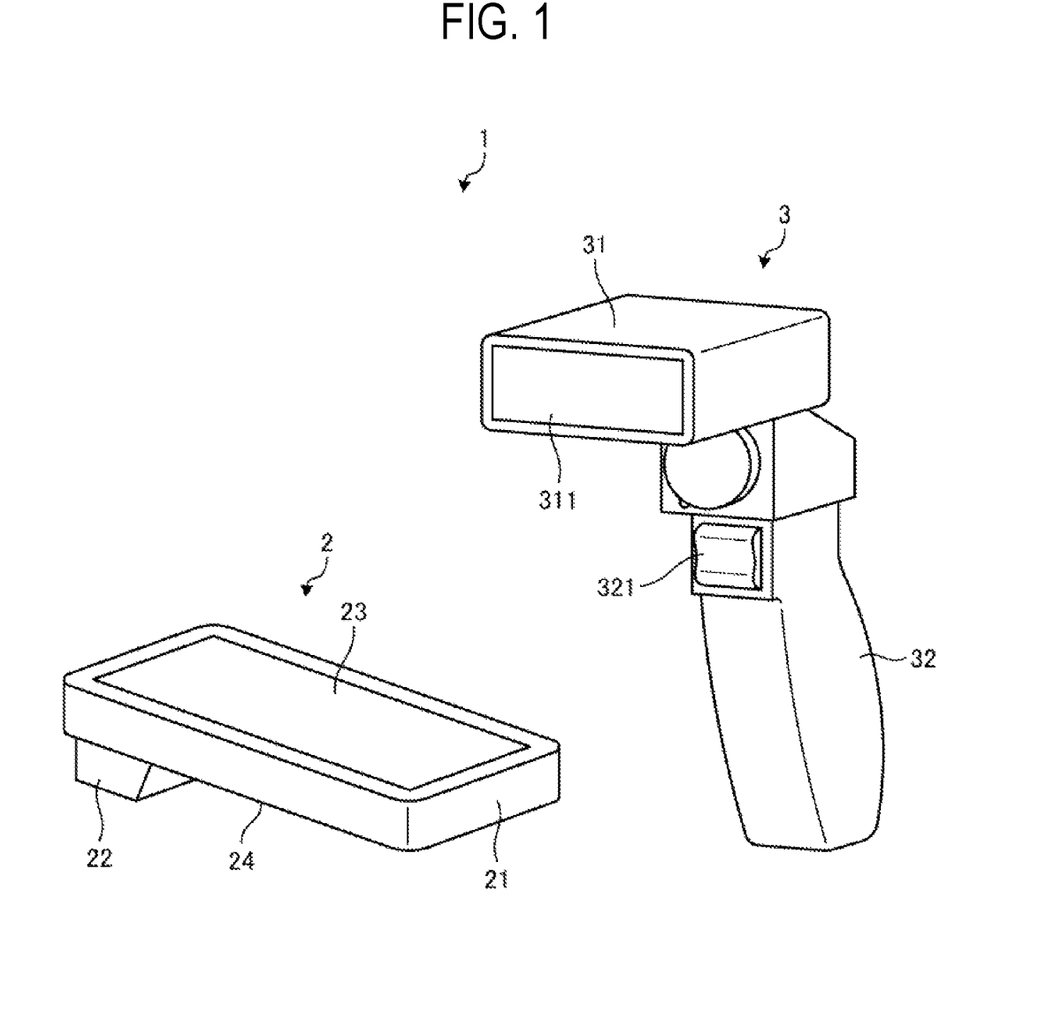
FIG. 1 is a perspective view illustrating an information reading apparatus according to an embodiment with a separated wireless tag reader and code reader.
Figure 2:
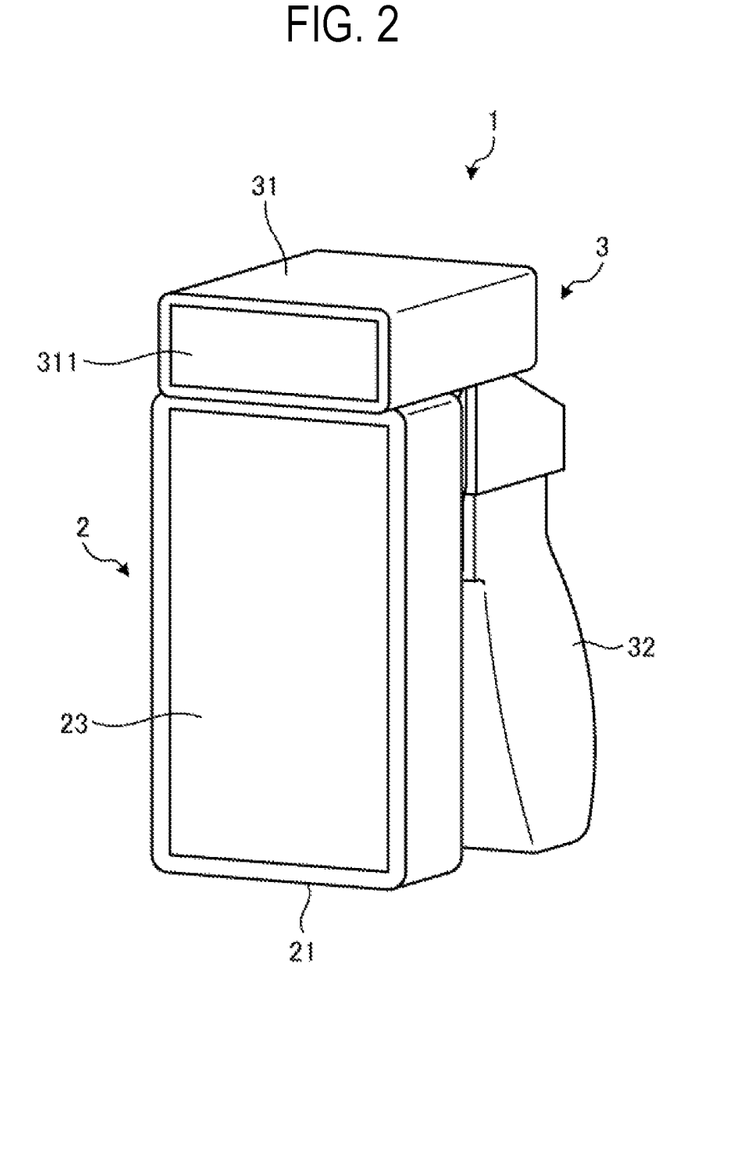
FIG. 2 is a perspective view illustrating an information reading apparatus according to an embodiment with an integrated wireless tag reader and code reader.

FIG. 1 is a perspective view showing an information reading apparatus 1 including a wireless tag reader 2 and a code reader 3 that are separated and are not mechanically connected to each other. FIG. 2 is a perspective view showing the information reading apparatus 1 including the wireless tag reader 2 and the code reader 3 that are mechanically connected to each other. As shown in the drawings, the information reading apparatus 1 includes a wireless tag reader 2 which is detachable from the code reader 3. The wireless tag reader 2 can be used independently as a stationary tag reader, and the code reader 3 can be used independently as a handheld code reader.

The wireless tag reader 2 reads tag information stored in a wireless tag by transmitting and receiving radio waves to and from the wireless tag. More specifically, the wireless tag reader 2 emits a carrier wave to the wireless tag and receives a response wave to the carrier wave from the wireless tag to acquire tag information included in the response wave. The wireless tag reader 2 includes a main body 21 and a support portion 22.

Figure 5:
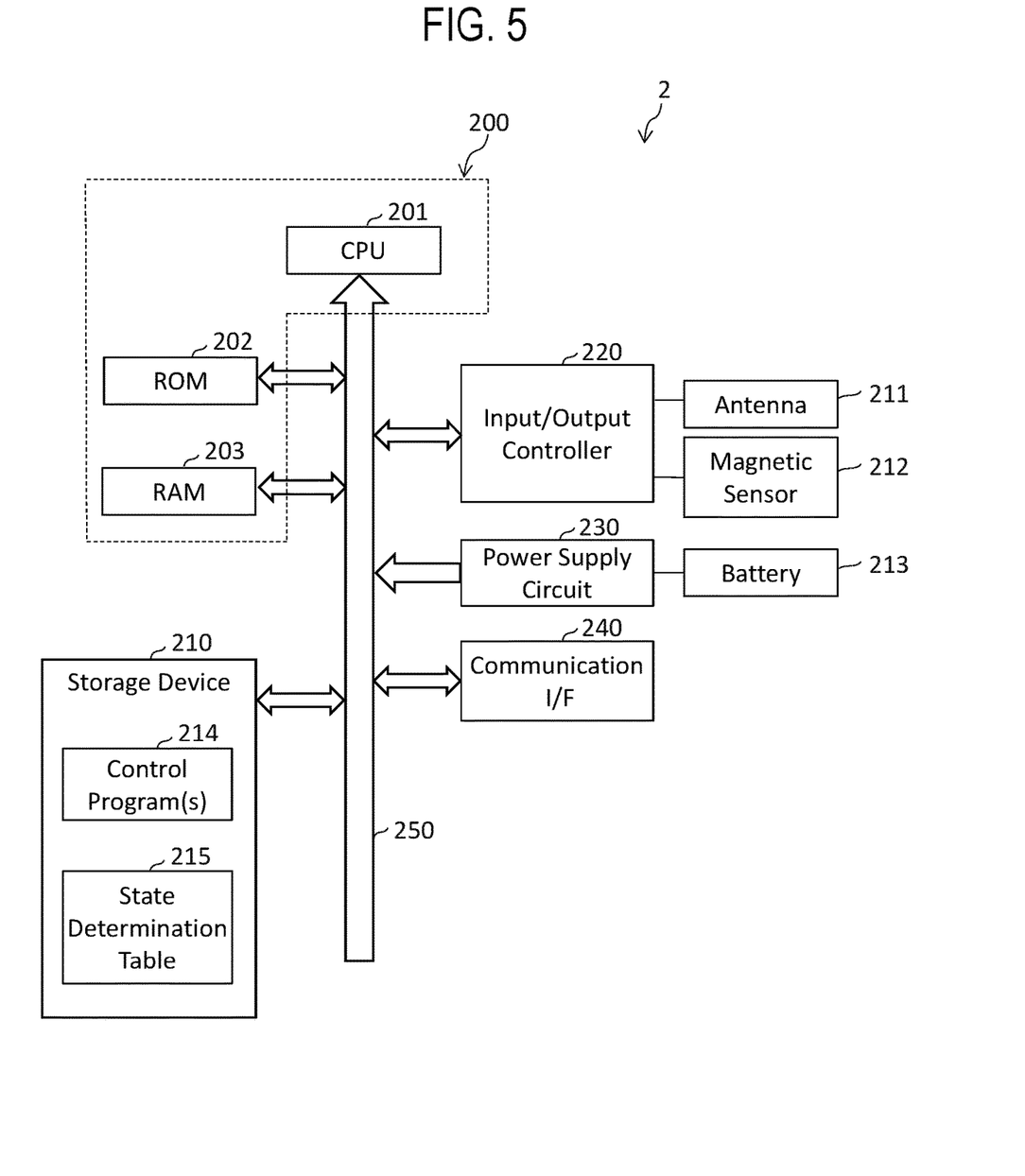
FIG. 5 is a hardware block diagram illustrating a wireless tag reader according to an embodiment.

The main body 21 is formed in a substantially rectangular parallelepiped shape, and accommodates therein a controller 200, an antenna 211, a magnetic sensor 212, a battery 213, and the like (see FIG. 5). A front surface 23 of the main body 21 is a radio wave radiation surface from which radio waves are emitted from the antenna 211 provided in the main body 21. The front surface 23 is also referred to as a reading surface 23 in some instances.

The support portion 22 is provided on a back surface 24 which is opposite to the reading surface 23. The support portion 22 is located on one end side in the longitudinal direction of the main body 21 and protrudes away from the back surface side. As shown in FIG. 1, when the wireless tag reader 2 is used independently, the support portion 22 supports the main body 21. As shown in FIG. 2, the support portion 22 also functions as a holding portion that holds the code reader 3 when the wireless tag reader 2 and the code reader 3 are connected to each other. That is, the support portion 22 detachably holds the code reader 3.

The code reader 3 optically reads code information indicated by a code symbol such as a bar code. For example, the code reader 3 decodes the captured code symbol and reads the code information indicated by the code symbol. The decoding of the code symbol may be performed by the controller 200 in some examples. The code reader 3 may read code information by emitting laser light and receiving the reflected light from a code symbol. The code reader 3 includes a scanner unit 31 and a grip 32.

Figure 7:
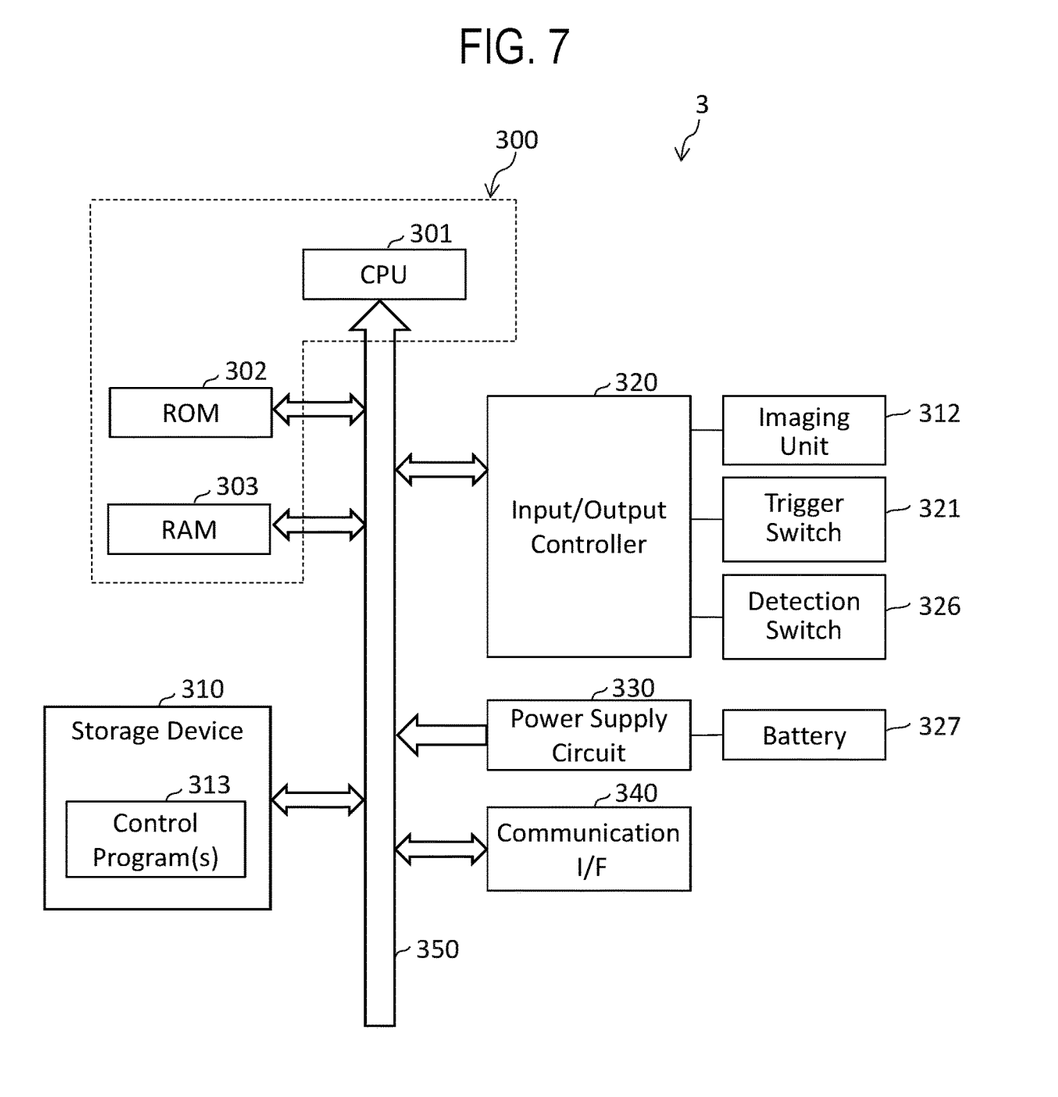
FIG. 7 is a hardware block diagram illustrating a code reader according to an embodiment.

The scanner unit 31 includes a reading window 311 provided at one end of the grip 32 and an imaging unit 312 (see FIG. 7). The imaging unit 312 includes, for example, an optical imaging element such as a CCD (Charge Coupled Device) imaging region facing the reading window 311. The surface with the reading window 311 may be referred to as a front surface, and the surface on the opposite side of the scanner unit 31 from the reading window 311 may be referred to as the back surface.

The grip 32 is gripped by a user when the code reader 3 is being used. The grip 32 includes a trigger switch 321. The trigger switch 321 is used by the user to control the operation of the scanner unit 31. Specifically, when the trigger switch 321 is pressed by the user, the imaging unit 312 performs imaging and reads code information from the imaged code symbol. The trigger switch 321 is one example of an input operation unit for controlling the scanner unit 31.

As shown in FIG. 2, the information reading apparatus 1 can be a handheld device when the code reader 3 is attached to the back surface side of the wireless tag reader 2. When the code reader 3 is attached to the wireless tag reader 2, the reading surface 23 of the wireless tag reader 2 and the reading window 311 of the code reader 3 face the same direction.

Figure 3:
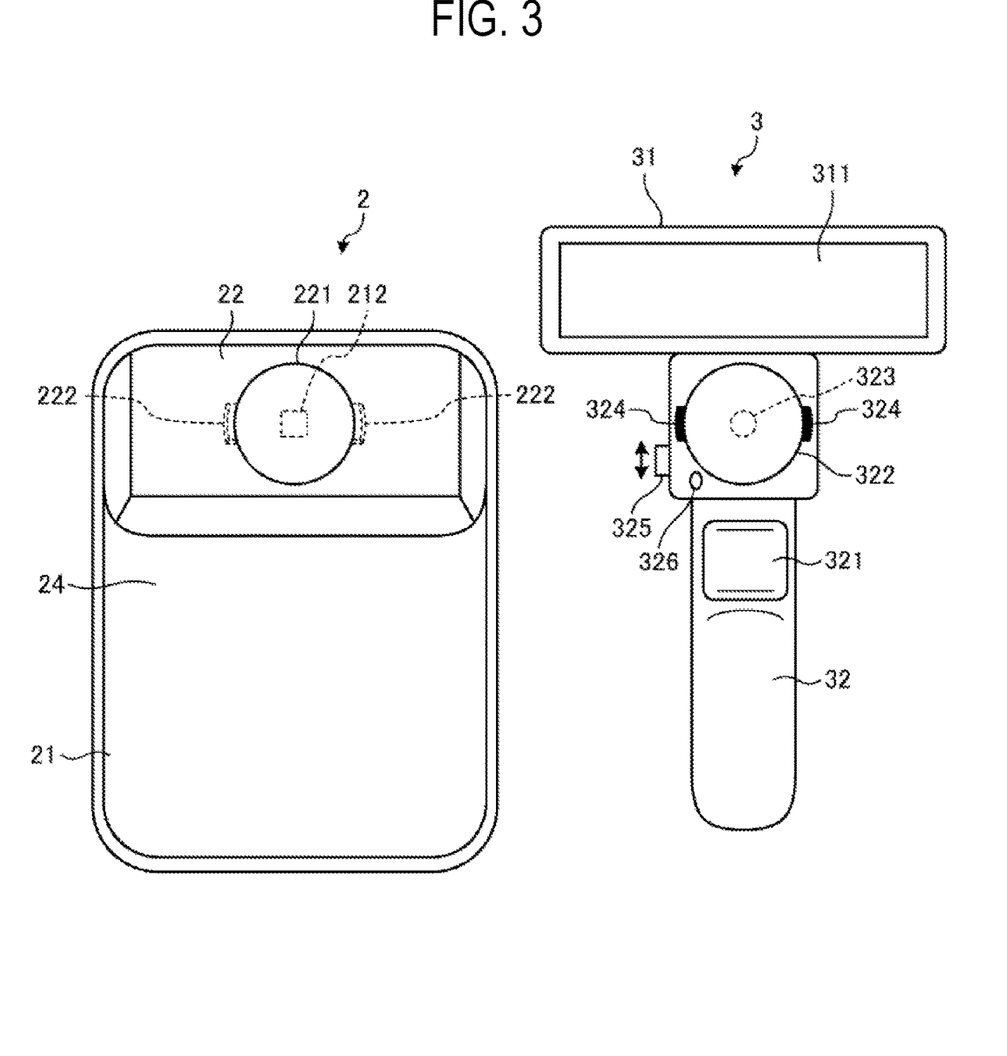
FIG. 3 is a plan view illustrating a back surface of a wireless tag reader and a front surface of a code reader of an information reading apparatus according to an embodiment.

FIG. 3 shows the wireless tag reader 2 as seen from the back surface side and the code reader 3 as seen from the front surface side.

The support portion 22 protrudes from the back surface of the wireless tag reader 2 and includes a circular groove 221 at the center in the width direction (which is, the left-right page direction in FIG. 3). A magnetic sensor 212 is provided in the support 22 at the center of the groove 221.

The support portion 22 includes a pair of lock-recessed portions 222 facing each other across the circular groove 221. Each lock-recessed portion 222 is formed in a recessed shape from the outer peripheral surface of the groove 221 toward the outside in the radial direction of the groove 221.

The grip 32 of the code reader 3 has a cylindrical convex portion 322. The convex portion 322 is provided on the front surface side of the code reader 3 and below the reading window 311. When the code reader 3 is attached to the wireless tag reader 2, the convex portion 322 enters the groove 221 formed in the wireless tag reader 2. In a state where the convex portion 322 enters the groove 221, the outer peripheral surface of the convex portion 322 and the inner peripheral surface of the groove 221 are in frictional contact with each other. A magnet 323 which moves in accordance with the operation of the trigger switch 321 is provided in the convex portion 322. The functions of the magnetic sensor 212 provided in the wireless tag reader 2 and the functions of the magnet 323 provided in the code reader 3 will be described later.

The convex portion 322 includes a pair of lock claws 324 that are retractable from the outer peripheral surface thereof. The lock claw 324 is provided corresponding to the lock-recessed portions 222 provided in the wireless tag reader 2.

The lock claw 324 can be moved in and out from the outer peripheral surface of the convex portion 322 by an interlocking mechanism according to an operation of an operation knob or a sliding switch 325 provided on the grip 32. Specifically, in a state where the operation knob 325 is at a lower position as shown in FIG. 3, the lock claws 324 protrude from the outer peripheral surface of the convex portion 322. When the operation knob 325 is slid upward from the state shown in FIG. 3, the lock claws 324 are retracted into the convex portion 322 by the interlocking mechanism. The convex portion 322 is detachably held by the support portion 22 provided in the wireless tag reader 2. The convex portion 322 and the support portion 22 function as a connection portion for detachably connecting the wireless tag reader 2 and the code reader 3.

A detection switch 326 is provided on the grip 32 so as to be retractable in the front direction in which the convex portion 322 is attached to the support portion 22. In a state where the code reader 3 is attached to the wireless tag reader 2, the detection switch 326 is pressed by the support portion 22 of the wireless tag reader 2. As a result, the code reader 3 detects that it is attached to the wireless tag reader 2. The configuration for detecting that the code reader 3 is attached to the wireless tag reader 2 is not limited to the mechanical switch. A battery 327 (see FIG. 7) is provided in the grip 32.

The wireless tag reader 2 and the code reader 3 can be connected as follows. The user slides the operation knob 325 of the code reader 3 upward to retract the lock claws 324 into the convex portion 322. Thereafter, the user inserts the convex portion 322 into the groove 221 of the wireless tag reader 2, and aligns the pair of lock-recessed portions 222 and the pair of lock claws 324. It is preferable to print a mark on the support portion 22 so that the user can align the lock-recessed portions 222 with the lock claws 324 easily.

The user slides the operation knob 325 downward in a state where the lock-recessed portions 222 and the lock claws 324 are aligned with each other. Then, the lock claws 324, which protrude from the outer periphery of the convex portion 322, and enter the lock-recessed portions 222, and the lock claws 324 and the lock-recessed portions 222 are engaged (locked) with one another. As a result, the code reader 3 is attached to the wireless tag reader 2 and both are integrated as the information reading apparatus 1. Therefore, the user can easily move the information reading apparatus 1 including the wireless tag reader 2 by holding the grip 32. The detachable configuration for attaching and detaching the wireless tag reader 2 and the code reader 3 is not limited to the above example, and other known detachable configurations can be adopted.

Figure 4:
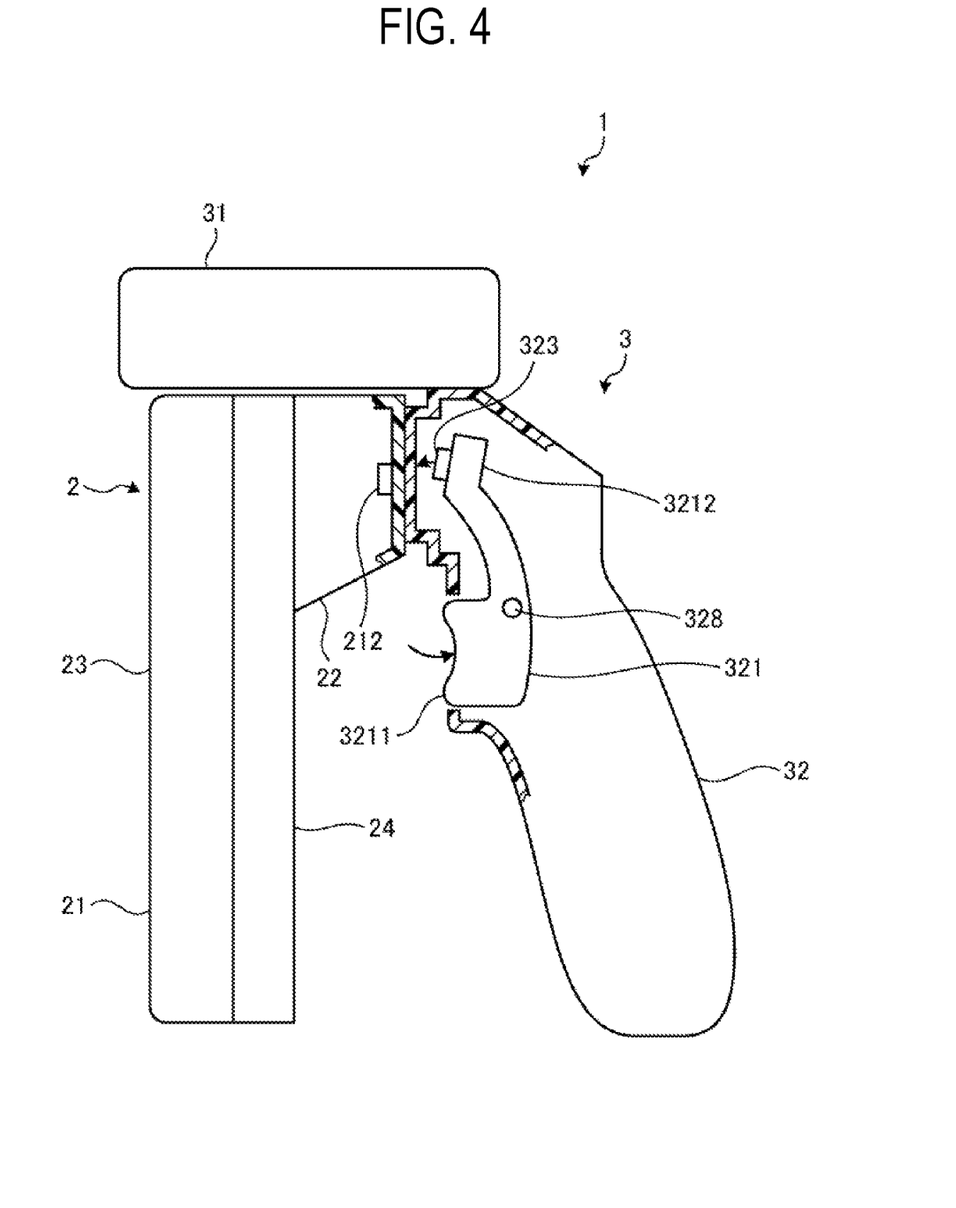
FIG. 4 is a diagram illustrating an internal structure of an information reading apparatus according to an embodiment.

Next, the internal structure of the information reading apparatus 1 will be described. FIG. 4 is a view showing a part of the internal structure in a state where the code reader 3 is attached to the wireless tag reader 2. The magnetic sensor 212 provided in the support portion 22 detects magnetism generated by the magnet 323 provided in the code reader 3. For example, the magnetic sensor 212 detects a magnetic flux density.

A trigger switch 321 that is provided in the grip 32 of code reader 3 is rotatably supported by a shaft 328. The lower end of the trigger switch 321 is the pressing part 3211, which is exposed on the outside of the grip 32, and can be pressed by the user. A magnet 323 is provided at an upper end part 3212 of the trigger switch 321. The trigger switch 321 can be constantly biased by a biasing member (e.g., a spring) in the direction in which the pressing part 3211 extends from the grip 32. When the user presses the pressing part 3211 against this biasing force, the upper end part 3212 moves toward the magnetic sensor 212. The distance between the magnetic sensor 212 and the magnet 323 will change according to the operation of the trigger switch 321. With the above configuration, the wireless tag reader 2 can recognize the operation of the trigger switch 321 based on the output of the magnetic sensor 212.

Specifically, when the user presses the pressing part 3211 when the wireless tag reader 2 and the code reader 3 are connected to each other, the magnet 323 will approach the magnetic sensor 212. That is, the magnetic flux density detected by the magnetic sensor 212 will be higher than that when the pressing part 3211 of the trigger switch 321 is not being pressed by a user.

On the other hand, when the user releases (stops pressing) the pressing part 3211, the trigger switch 321 rotates in back in the direction of the biasing force from the biasing member. Thus, the magnet 323 provided at the upper end part 3212 of the trigger switch 321 moves away from the magnetic sensor 212 and the magnetic flux density detected by the magnetic sensor 212 becomes lower than when the user presses the pressing part 3211. Therefore, the wireless tag reader 2 can recognize the operation of the trigger switch 321 based on the magnetic flux density detected by the magnetic sensor 212.

The wireless tag reader 2 can also detect whether the code reader 3 is presently attached based on the output of the magnetic sensor 212. Specifically, when the code reader 3 is not attached to the wireless tag reader 2, the distance between the magnetic sensor 212 and the magnet 323 will generally be greater than when the code reader 3 is attached to the wireless tag reader 2.

Therefore, the magnetic flux density detected by the magnetic sensor 212 lessens when the code reader 3 is attached to the wireless tag reader 2 (even if the trigger switch 321 is not being pressed) as compared to the unconnected state. The wireless tag reader 2 can thus detect a change in the magnetic flux density detected by the magnetic sensor 212 and the presence or absence (attachment) of the code reader 3 can be detected.

As described above, the magnetic sensor 212 detects whether the code reader 3 is attached to the wireless tag reader 2 and also whether the trigger switch 321 is operated when the code reader 3 is attached.

FIG. 5 is a hardware block diagram illustrating of the wireless tag reader 2. The wireless tag reader 2 includes the controller 200, a storage device 210, an input/output controller 220, a power supply circuit 230, and a communication I/F (Interface) 240 or the like. The controller 200, the storage device 210, the input/output controller 220, the power supply circuit 230, and the communication I/F 240 are connected to each other via a bus 250.

The controller 200 includes a CPU (Central Processing Unit) 201, a ROM (Read Only Memory) 202, and a RAM (Random Access Memory) 203. The CPU 201, the ROM 202, and the RAM 203 are connected to each other via the bus 250.

The CPU 201 controls the overall operations of the wireless tag reader 2. The ROM 202 stores various programs to be executed by the CPU 201 and various data. The RAM 203 is used as a work area of the CPU 201, and temporarily stores the various programs stored in the ROM 202 and the storage device 210 and various data. The CPU 202 of the controller 200 executes various control processes of the wireless tag reader 2 according to the programs stored in the ROM 202 or the storage device 210 and loaded into the RAM 203.

The storage device 210 is, for example, an HDD (Hard Disk Drive) or an SSD (Solid State Memory). The storage device 210 stores a control program(s) 214 and a state determination table 215. The control program(s) 214 is, for example, a control program for controlling the wireless tag reader 2.

The state determination table 215 is a table in which the magnetic flux density detected by the magnetic sensor 212 and the state of the code reader 3 with respect to the wireless tag reader 2 are associated with each other.

Figure 6:
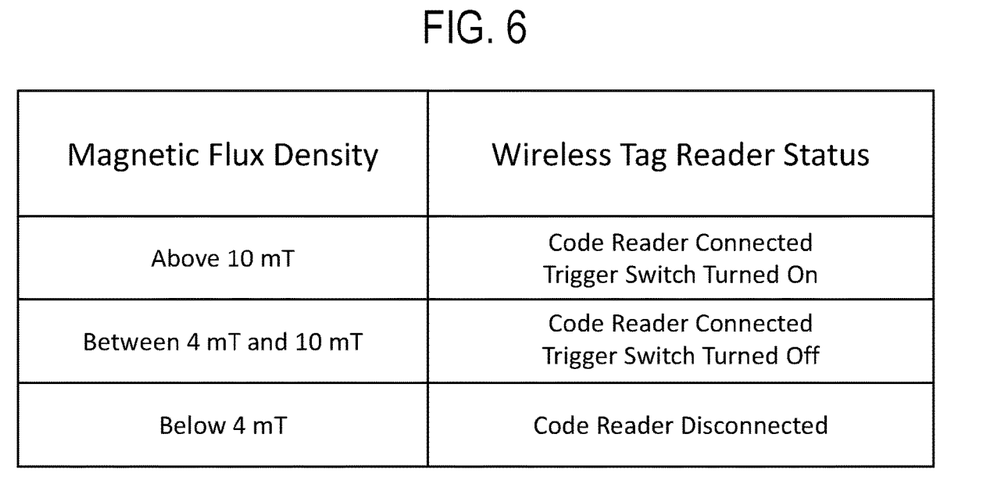
FIG. 6 is a diagram illustrating a data structure of a state determination table according to an embodiment.

FIG. 6 is a diagram illustrating a data structure of the state determination table 215 according to an embodiment. In this example, in a case where the magnetic flux density detected by the magnetic sensor 212 or the code reader 3 is not connected are associated with each other, the magnetic flux density is assumed to be less than 4 mT (milli tesla). That is, when the magnetic flux density detected by the magnetic sensor 212 is less than 4 mT, the controller 200 determines that the code reader 3 is not attached to the wireless tag reader 2.

The case where the magnetic flux density detected by the magnetic sensor 212 is between 4 mT and 10 mT is associated with the case where the code reader 3 is connected but the trigger switch 321 is turned off. That is, when the magnetic flux density detected by the magnetic sensor 212 is in a range of 4 mT to 10 mT, the controller 200 determines that the code reader 3 is presently attached to the wireless tag reader 2 but that the trigger switch 321 is not being pressed, so the code reader 3 is detected as connected but the trigger switch 321 is determined to be off.

Similarly, the case where the magnetic flux density detected by the magnetic sensor 212 exceeds 10 mT is associated with the code reader 3 being connected and the trigger switch 321 being turned on (pressed). That is, when the magnetic flux density detected by the magnetic sensor 212 exceeds 10 mT, the controller 200 determines that the code reader 3 is presently attached to the wireless tag reader 2 and the trigger switch 321 is being pressed.

The input/output controller 220 is connected to the antenna 211 and the magnetic sensor 212. The input/output controller 220 is an input/output interface between the controller 200 and the antenna 211 and the magnetic sensor 212. Thus, the controller 200 can transmit and receive information or data to and from the antenna 211 and the magnetic sensor 212 via the input/output controller 220, and can control these hardware components by sending particular commands thereto. The antenna 211 and the input/output controller 220 make up a reading unit that reads tag information from a wireless tag.

The power supply circuit 230 is connected to the battery 213. The power supply circuit 230 is a circuit that supplies power to each piece of hardware of the wireless tag reader 2. The power supply circuit 230 supplies power to each piece of hardware by, for example, stepping down the voltage supplied from the battery 213 to each operating voltage.

The communication I/F 240 is a network interface circuit for communicating with an external device. The communication I/F 240 is connected to a POS terminal when the wireless tag reader 2 is used for checkout without being connected to the code reader 3, for example. In addition, the communication I/F 240 is connected to an inventory management server, for example, when the wireless tag reader 2 is connected to the code reader 3 and used for inventory.

FIG. 7 is a hardware block diagram illustrating of the code reader 3. The code reader 3 includes a controller 300, a storage device 310, an input/output controller 320, a power supply circuit 330, and a communication I/F (Interface) 340.

The controller 300, the storage device 310, and the input/output controller 320, the power supply circuit 330, and the communication I/F 340 are connected to each other via a bus 350.

The controller 300 includes a CPU 301, a ROM 302, and a RAM 303. The CPU 301, the ROM 302, and the RAM 303 are connected to each other via the bus 350.

The CPU 301 controls the overall operation of the code reader 3. The ROM 302 stores various programs such as programs executed by the CPU 301 and various data. The RAM 303 is used as a work area of the CPU 301, and temporarily stores various programs stored in and loaded from the ROM 302 and the storage device 310 and various data. The CPU 301 of the controller 300 executes various control processes of the wireless tag reader 3 according to control programs stored in the ROM 302 or the storage device 310 and loaded into the RAM 303.

The storage device 310 is, for example, an HDD or an SSD. The storage device 310 stores a control program(s) 313. The control program(s) 313 is, for example, a control program for controlling the code reader 3.

The input/output controller 320 is connected to the imaging unit 312, the trigger switch 321, and the detection switch 326. The input/output controller 320 is an input/output interface between the controller 300 and the connected hardware for controlling the hardware. Thus, the controller 300 can transmit and receive information or data to and from the imaging unit 312, the trigger switch 321, and the detection switch 326 via the input/output controller 320, and can control these pieces of hardware according to particular commands.

The power supply circuit 330 is connected to the battery 327. The power supply circuit 330 is a circuit that supplies power to each piece of hardware of the code reader 3. The power supply circuit 330 supplies power to each piece of hardware by, for example, stepping down the voltage supplied from the battery 327 to each operating voltage.

The communication I/F 340 is a network interface circuit for communicating with an external device. The communication I/F 340 is connected to a POS terminal when the code reader 3 is used for checkout without being connected to the wireless tag reader 2, for example. The communication I/F 340 is connected to an inventory management server, for example, when the code reader 3 is connected to the wireless tag reader 2 and used for inventory management.

Figure 8:
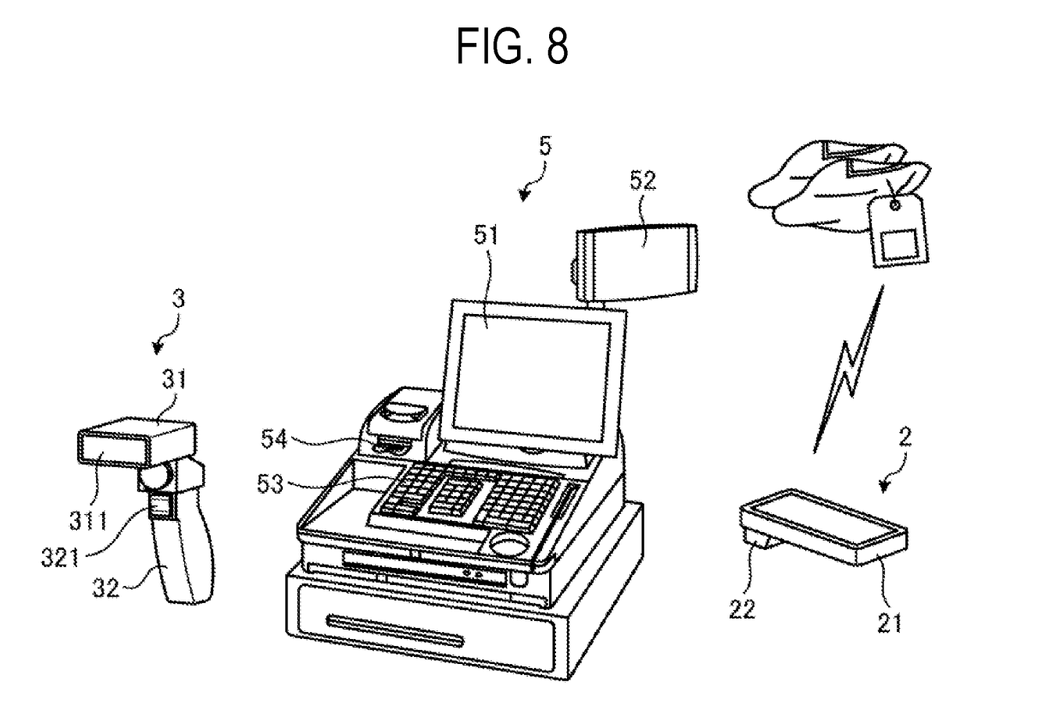
FIG. 8 is a diagram illustrating a wireless tag reader and a code reader being used in a separated state.

Usage modes of the information reading apparatus 1 based on the above configuration will be described. FIG. 8 is a diagram showing a usage mode in which each of the wireless tag reader 2 and the code reader 3 is used alone. In this example, the wireless tag reader 2 and the code reader 3 are used in a POS system installed in a store.

The wireless tag reader 2 and the code reader 3 are connected to the POS terminal 5 via a network such as LAN (Local Area Network). The wireless tag reader 2 reads tag information from a wireless tag attached to a commodity such as a cloth, for example, and transmits the tag information to the POS terminal 5. The code reader 3 reads code information from a bar code attached to a commodity to which a wireless tag is not attached, such as food, and transmits the code information to the POS terminal 5. The tag information and the code information are commodity information indicating a commodity code, a commodity name, a price, and the like.

In this usage mode, since the wireless tag reader 2 and the code reader 3 are used in a limited range around the POS terminal 5, power may be supplied not from the battery but by wire through a power cord.

The POS terminal 5 includes an operator display 51, a customer display 52, a keyboard 53, and a receipt printer 54. The display 51 and the customer display 52 display the commodity information of commodities purchased by the customer and the total amount of one transaction.

The keyboard 53 includes various keys. For example, the various keys include a selection key for selecting a payment method, numeric keys for manually inputting a commodity code or a price of a commodity, a subtotal key for declaring calculation of a total sales amount, a closing key for declaring closing processing of one transaction to settle a price, a confirmation key for confirming a numeric input by the numeric keys, a clear key for clearing the input, and the like.

The receipt printer 54 prints information relating to one transaction and issues a receipt. The information related to one transaction printed on the receipt includes the name of the purchased commodity, commodity information such as a unit price, and a transaction amount.

In the usage mode shown in FIG. 8, the controller 200 of the wireless tag reader 2 detects that the code reader 3 is not attached based on the output of the magnetic sensor 212. In this state, the controller 200 controls the antenna 211 based on a reading start instruction input from the POS terminal 5 via the communication I/F 240. Specifically, when the controller 200 receives the reading start instruction from the POS terminal 5 at the time of starting the checkout process for paying the price of the commodity purchased by the customer, the control unit 101 causes the antenna 211 to emit radio waves to start reading the tag information.

When a commodity to which a wireless tag is attached is placed in a reading range of the wireless tag reader 2, the controller 200 reads tag information from the wireless tag. The controller 200 transmits the read tag information to the POS terminal 5 via the communication I/F 240.

On the other hand, the commodity information of the commodity to which the bar code is attached instead of the radio tag is read by the code reader 3. The operator grips the grip 32 of the code reader 3 and directs the reading window 311 of the scanner unit 31 toward the bar code attached to the commodity. Thereafter, the operator presses the pressing part 3211 of the trigger switch 321.

When the controller 300 of the code reader 3 detects that the trigger switch 321 is pressed, the controller 300 controls the imaging unit 312 to read the code information. The controller 300 transmits the read code information to the POS terminal 5 via the communication I/F 340. Note that when the trigger switch 321 is turned on, the magnet 323 moves, but since it is greatly separated from the magnetic sensor 212 of the wireless tag reader 2, the wireless tag reader 2 continues to detect that the code reader 3 is not connected.

The POS terminal 5 performs checkout processing based on the tag information received from the wireless tag reader 2 and the code information received from the code reader 3. As described above, when the information reading apparatus 1 is used for checkout processing, the wireless tag reader 2 can be used as a stationary reader and the code reader 3 can be used as a handheld reader, so that the checkout operation by the operator can be facilitated. Note that the POS terminal 5 may be a self-service POS terminal in which the customer himself/herself performs a checkout operation.

Next, a usage mode in which the wireless tag reader 2 and the code reader 3 are connected to each other will be described with reference to FIG. 9. In this example, the information reading apparatus 1 is used in an inventory management system of a store.

The information reading apparatus 1 is wirelessly connected to the inventory management server 6 via a network such as a LAN. The inventory management server 6 stores an inventory management database for managing the commodity inventory of the store.

The information reading apparatus 1 reads tag information from radio tags attached to commodities displayed on a plurality of display shelves 7 in the store and transmits the tag information to the inventory management server 6. The information reading apparatus 1 reads code information from code symbols attached to commodities displayed on the display shelves 7 and transmits the code information to the inventory management server 6. The wireless tag reader 2 and the code reader 3 connected to each other are driven by their own batteries 213 and 327, respectively.

When detecting that the code reader 3 is connected by the output of the magnetic sensor 212, the controller 200 of the wireless tag reader 2 switches the output destination of the read tag information from the POS terminal 5 to the inventory management server 6. That is, the controller 200 switches the output destination of the read tag information when it is detected that the code reader 3 is connected to the wireless tag reader 2. In this example, the output destination of the read tag information is set to the POS terminal 5 when the code reader 3 is not connected to the wireless tag reader 2, and is set to the inventory management server 6 when the code reader 3 is connected to the wireless tag reader 2. However, the output destination may be set differently depending on the inventory management system of the store.

The controller 200 controls the antenna 211 to emit radio waves when detecting that the trigger switch 321 of the code reader 3 is turned on by the output of the magnetic sensor 212, and stop the emission when detecting that the trigger switch 321 is released. That is, when it is detected that the code reader 3 is connected to the wireless tag reader 2, the controller 200 controls the reading unit according to the operation of the trigger switch 321 provided in the grip 32 of the code reader 3. When the trigger switch 321 is turned on in a state where the wireless tag reader 2 and the code reader 3 are connected to each other, radiation of radio waves from the antenna 211 and imaging by the imaging unit 312 are executed. Apart from the trigger switch 321, an operation switch for controlling the operation of the operation unit 211 may be provided.

When detecting that the code reader 3 is connected to the wireless tag reader 2 by the output of the detection switch 326, the controller 300 of the code reader 3 switches the output destination of the read code information from the POS terminal 5 to the inventory management server 6. That is, the controller 300 switches the output destination of the read code information when it is detected that the wireless tag reader 2 is mounted.

Figure 9:
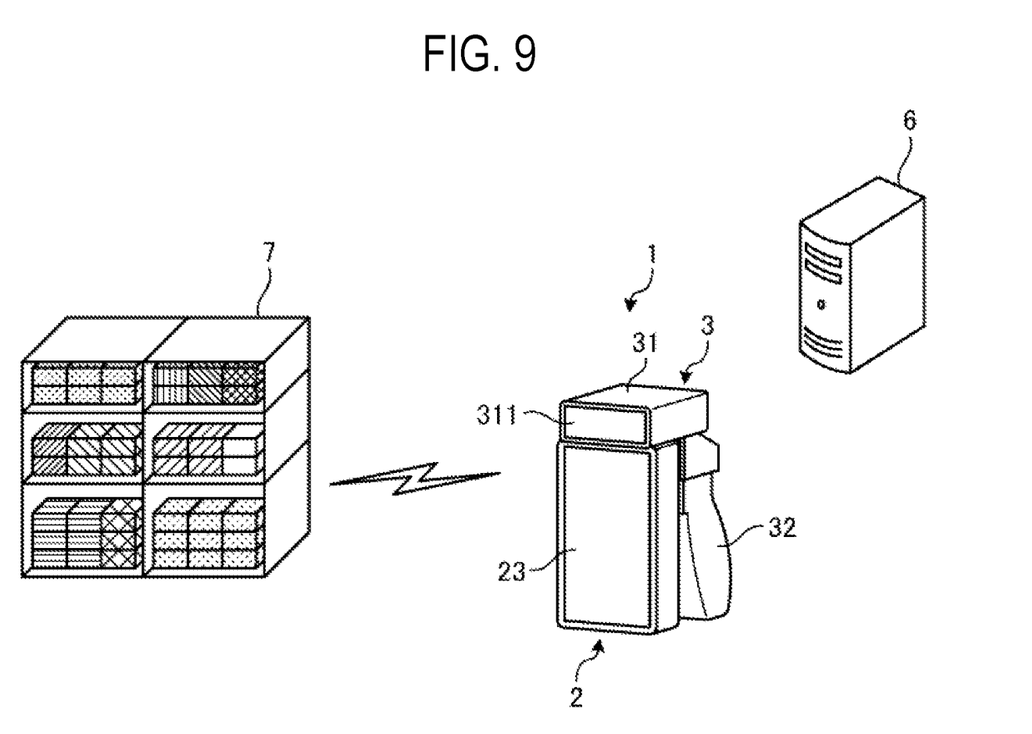
FIG. 9 is a diagram illustrating a wireless tag reader and a code reader being used in an integrated state.

In the use mode shown in FIG. 9, the inventory work is performed. The store clerk who performs the inventory work grips the grip 32 and directs the reading surface 23 of the wireless tag reader 2 toward the display shelf 7 on which the commodity to which the wireless tag is attached is displayed. Thereafter, the clerk turns on the trigger switch 321.

The controller 200 of the wireless tag reader 2 detects that the trigger switch 321 has been turned on, controls the antenna 211 to emit radio waves, and reads tag information. The information reading apparatus 1 can collectively read information of wireless tags attached to commodities displayed on the display shelves 7 by the wireless tag reader 2. In addition, since the information reading apparatus 1 functions as a handheld wireless tag reader by integrating the wireless tag reader 2 and the code reader 3, the reading surface 23 is easily directed to the display shelf 7, and the operability is excellent. The controller 200 transmits the read tag information to the inventory management server 6 via the communication I/F 240.

The code reader 3 of the information reading apparatus 1 is used for reading information from a commodity to which a barcode is attached instead of a wireless tag. The clerk grips the grip 32 of the code reader 3 and directs the reading window 311 of the scanner unit 31 toward the bar code attached to the commodity. Thereafter, the clerk turns on the trigger switch 321.

The controller 300 of the code reader 3 detects that the trigger switch 321 is turned on, controls the imaging unit 312 to capture an image, and reads code information. The controller 300 transmits the read code information to the inventory management server 6 via the communication I/F 340. The inventory management server 6 updates the inventory management database based on the received tag information and code information. Thus, the store can manage the inventory of the commodities easily.

As described above, the information reading apparatus 1 includes the wireless tag reader 2 including the reading unit that reads the tag information stored in the wireless tag, the scanner unit 31 that reads the code information indicated by the code symbol, the grip 32 that can be gripped by the user when the scanner unit 31 reads the code information, and the code reader 3 that is detachably connected to the wireless tag reader 2.

Therefore, not only can the wireless tag reader 2 and the code reader 3 be used independently without being connected to each other, but also they can be integrated and used as a handheld wireless tag reader and a handheld code reader. Therefore, the information reading apparatus 1 can be used in many usage modes, and the wireless tag reader 2 and the code reader 3 can be efficiently utilized.

Further, the information reading apparatus 1 includes the controller 200 for controlling the antenna 211 according to the operation of the trigger switch 321 provided on the grip 32 of the code reader 3 when the wireless tag reader 2 detects that the code reader 3 is connected to the wireless tag reader 2.

Therefore, in a state where the code reader 3 is attached to the wireless tag reader 2, the antenna 211 can be controlled by the trigger switch 321 provided in the grip 32. Therefore, the wireless tag reader 2 is used like a handheld reader because of the grip 32, and the operability thereof can be improved.

Further, the information reading apparatus 1 includes the trigger switch 321 that can be used for controlling both the antenna 211 in a state where the code reader 3 is attached to the wireless tag reader 2 and the scanner unit 31 in a state where the code reader 3 is not attached to the wireless tag reader 2.

Therefore, the information reading apparatus 1 does not needs to separately provide an additional part for controlling the antenna 211 when the code reader 3 is attached to the wireless tag reader 2. Therefore, the configuration of the information reading apparatus 1 can be simplified.

Furthermore, the wireless tag reader 2 switches an output destination of the read tag information when it is detected that the code reader 3 is connected to the wireless tag reader 2. Similarly, the code reader 3 switches the output destination of the read code information when it is detected that the code reader 3 is attached to the wireless tag reader 2.

Therefore, it is not necessary to set the output destination of the tag information and the code information every time the usage mode is changed. Therefore, operability can be improved.

It should be noted that the information reading apparatus 1 is not limited to use in the above-described usage modes, and can be used in places other than stores. For example, in a distribution center, the wireless tag reader 2 may be used as a stationary wireless tag reader and the code reader 3 may be used as a handheld code reader at the time of inspection of goods to be shipped, and the wireless tag reader 2 and the code reader 3 may be and used at the time of inventory for checking the number of commodities in inventory. Also in such a case, the information reading apparatus 1 achieves the same effects described above.

Figure 10:
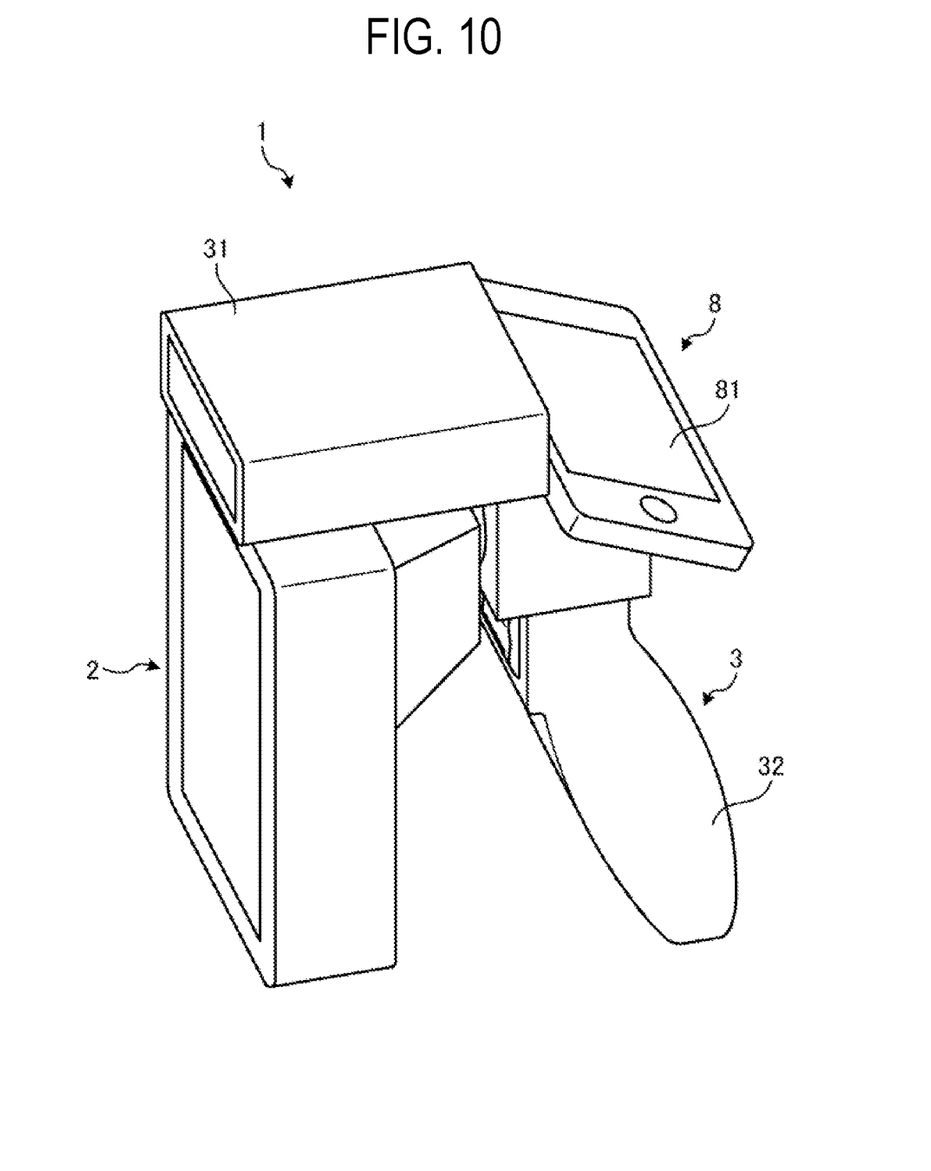
FIG. 10 is a perspective view illustrating an information reading apparatus according to a modification.

Next, certain modifications of the above-described embodiments will be described. FIG. 10 is a diagram illustrating a modified example of the information reading apparatus 1. The information reading apparatus 1 includes a holding portion that detachably holds an information terminal 8 such as a smartphone.

The information terminal 8 held by the holding portion includes a display unit 81. The display unit 81 is, for example, a liquid crystal display (LCD) with a touch panel, and also functions as an input unit. The information terminal 8 includes a memory that stores a control program(s) for controlling the information reading apparatus 1.

When the controller 200 of the wireless tag reader 2 detects that the wireless tag reader 2 and the code reader 3 are connected, the wireless tag reader 2 sets the communication destination of the communication I/F 240 to the information terminal 8. Then, the controller 200 controls the wireless tag reader 2 in accordance with an instruction output from the information terminal 8 in accordance with the control program of the information terminal 8. Similarly, when detecting that the wireless tag reader 2 and the code reader 3 are connected to each other, the controller 300 of the code reader 3 sets the communication destination of the communication I/F 340 to the information terminal 8. The controller 300 controls the code reader 3 in accordance with an instruction output from the information terminal 8 in accordance with the control program of the information terminal 8. That is, when the wireless tag reader 2 and the code reader 3 are connected to each other, the information reading apparatus 1 is controlled by the information terminal 8.

The modified information reading apparatus 1 can be used in the same manner as in the above-described embodiments. The tag information read by the wireless tag reader 2 and the code information read by the code reader 3 can be transmitted to a desired device such as an inventory management server via the information terminal 8.

In the information reading apparatus 1 of this modified example, the same effects as the information reading apparatus 1 of the above-described embodiments can be obtained. In addition, according to the information reading apparatus 1 of the modification example, since the display unit 81 of the information terminal 8 can provide visual aids for the user, it is possible to improve operability.

Furthermore, with the information reading apparatus 1 of the modification example, since the touch panel of the display unit 81 of the information terminal 8 is used as the input unit, it is possible to input information which could not be input with only the trigger switch 321, and it is possible to improve the usability of the information reading apparatus 1. For example, based on an input of a commodity name via the touch panel, the wireless tag reader 2 can search for a commodity displayed on a particular display shelf 7.

In the example embodiments described above, the control programs executed by the wireless tag reader 2, the code reader 3, and the information terminal 8 may be stored in and copied from a non-transitory computer-readable recording medium such as a CD-ROM. The control programs executed by the wireless tag reader 2, the code reader 3, and the information terminal 8 may be stored in and downloaded from a computer connected to a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reading apparatus, comprising:
   a wireless tag reader including an antenna and an antenna surface facing a first direction and through which the antenna emits a radio wave to read tag information from a wireless tag; and
   a code reader including an imaging unit and an imaging window facing the first direction and through which the imaging unit acquires an image to read a code, wherein
   the code reader further includes a grip detachably connected to the wireless tag reader.

2. The reading apparatus according to claim 1, wherein
   the grip of the code reader includes a trigger switch for causing the imaging unit to acquire an image, and
   the wireless tag reader further includes a controller configured to control the emission of the radio wave according to an operation of the trigger switch.

3. The reading apparatus according to claim 2, wherein
   the wireless tag reader further includes a sensor, and
   the controller is further configured to detect the connection between the wireless tag reader and the grip using an output from the sensor.

4. The reading apparatus according to claim 3, wherein
   a magnet is attached to the trigger switch of the grip,
   the sensor of the wireless tag reader is a magnetic sensor configured to detect a magnetic flux density, and
   the controller detects the connection based on the detected magnetic flux density.

5. The reading apparatus according to claim 4, wherein the controller is further configured to detect whether the trigger switch is operated based on the detected magnetic flux density.

6. The reading apparatus according to claim 1, wherein the wireless tag reader further includes:
   a network interface through which the tag information is output, and
   a controller configured to switch output destinations of the tag information depending on whether the grip of the code reader is connected to the wireless tag reader.

7. The reading apparatus according to claim 6, wherein
   the wireless tag is attached to a commodity sold at a store, and
   the tag information that is read from the wireless tag is output to either a point-of-sale terminal or an inventory management server.

8. The reading apparatus according to claim 1, wherein the code reader further includes:
a network interface through which the code is output, and
a controller configured to switch output destinations of the code depending on whether the grip of the code reader is connected to the wireless tag reader.

9. The reading apparatus according to claim 8, wherein
a symbol representing the code is indicated on a commodity sold at a store, and
the code that is read from the image of the symbol is output to either a POS terminal used at the store or an inventory management server for managing an inventory of the store.

10. The reading apparatus according to claim 1, wherein
a convex portion is formed at an end of the grip of the code reader, and
the wireless tag reader includes a support portion that protrudes towards a direction opposite to the first direction and has a groove into which the convex portion of the grip is inserted.

11. The reading apparatus according to claim 10, wherein
a retractable claw is formed on an outer surface of the convex portion, and
the groove has a recessed portion that engages with the claw when the convex portion of the grip is inserted into the groove.

12. The reading apparatus according to claim 11, wherein the grip includes a sliding switch for locking the claw at a position at which the claw protrudes from the outer surface of the convex portion.

13. The reading apparatus according to claim 1, wherein the code reader further includes:
a retractable switch formed on the grip and protruding towards the first direction, and
a controller configured to detect the connection with the wireless tag reader based on whether the switch is retracted.

14. The reading apparatus according to claim 1, further comprising:
an information terminal configured to receive the tag information read by the wireless tag reader and the code read by the code reader.

15. The reading apparatus according to claim 14, wherein the information terminal includes a display configured to display the received tag information and code.

16. A wireless tag reader, comprising:
an antenna by which a radio wave is emitted to read tag information from a wireless tag;
a main body including a first surface facing a first direction and through which the antenna emits the radio wave; and
a support portion protruding from the main body towards a direction opposite to the first direction and having a groove into which a grip of an optical code reader can be inserted.

17. The wireless tag reader according to claim 16, further comprising:
a controller configured to control the emission of the radio wave according to an operation of a trigger switch attached to the grip of the code reader.

18. The wireless tag reader according to claim 17, further comprising:
a sensor, wherein
the controller is further configured to detect the connection between the wireless tag reader and the grip using an output from the sensor.

19. A code reader, comprising:
an imaging unit configured to acquire an image to read a code;
an imaging window facing a first direction and through which the imaging unit acquires the image; and
a grip connectable to a groove of a wireless tag reader configured to emit a radio wave to read tag information from a wireless tag through a first surface facing the first direction.

20. The code reader according to claim 19, wherein
the grip includes a trigger switch for causing the imaging unit to acquire an image, and
the emission of the radio wave by the wireless tag reader is controlled according to an operation of the trigger switch.

* * * * *